April 2, 1946. M. SIGMUND 2,397,759

FILTER

Filed Aug. 13, 1943

Inventor:
Miroslav Sigmund
By Cushman Darby Cushman
attys.

Patented Apr. 2, 1946

2,397,759

UNITED STATES PATENT OFFICE 2,397,759

FILTER

Miroslav Sigmund, Gosforth, England

Application August 13, 1943, Serial No. 498,522
In Great Britain April 17, 1942

4 Claims. (Cl. 183—71)

This invention relates to improvements in filters for cleansing air, e. g. from noxious gases, and in particular to an improved filter insert pack of the type having a number of spaced layers of sheet filtering material, such as filter paper or fabric, so arranged that the air to be filtered can enter certain selected spaces and is obliged to pass through at least one layer of filtering material before it can pass into and emerge from certain other selected spaces.

According to the present invention a filter insert pack is made comprising two bands of filtering material coiled one over the other with the convolutions of one band interleaved with the convolutions of the other band but spaced therefrom, so that two separate chambers are formed interwound with one another and divided from one another on both sides by a wall of filtering material, each chamber having one edge closed at one end of the pack by means of sealing material lying between the borders of the bands forming the walls of the chamber and the other edge open at the other end of the pack, the convolutions of the closed edge of one chamber alternating with the convolutions of the open edge of the other chamber at the same end of the pack, and the two ends of the chambers being closed in a direction substantially axial of the pack, as for example by the two bands being laid close one upon the other, the arrangement being such that none of the fluid to be filtered can pass through the pack except by entering one of the chambers at one end of the pack and passing through a wall of filtering material into the other chamber from which it is free to escape at the other end of the pack.

The two bands may be stuck to one another where the chambers end, and the filter bands may be provided with adhesive for this purpose.

The pack may be wound on a mandrel, in which case the rolled pack has a hollow centre, and the wall of this central space and the outside wall of the pack may be coated with a non-permeable adhesive such as latex.

The filter bands may be spaced from one another by strips of paper corrugated transversely of the strips, so that they are easily traversed by the fluid to be filtered, the spacing strips being left in the pack. But spacing means may be used in the rolling of the pack, which are subsequently removed therefrom.

Although it is generally convenient to roll the pack into cylindrical form, it may equally well be rolled into elliptical form or substantially rectangular form.

Filter insert packs made according to the present invention are illustrated in the accompanying drawing, in which Fig. 1 is a perspective view showing the two bands of filter paper, with the intervening strips of spacing material, in course of being wound.

Figure 1:
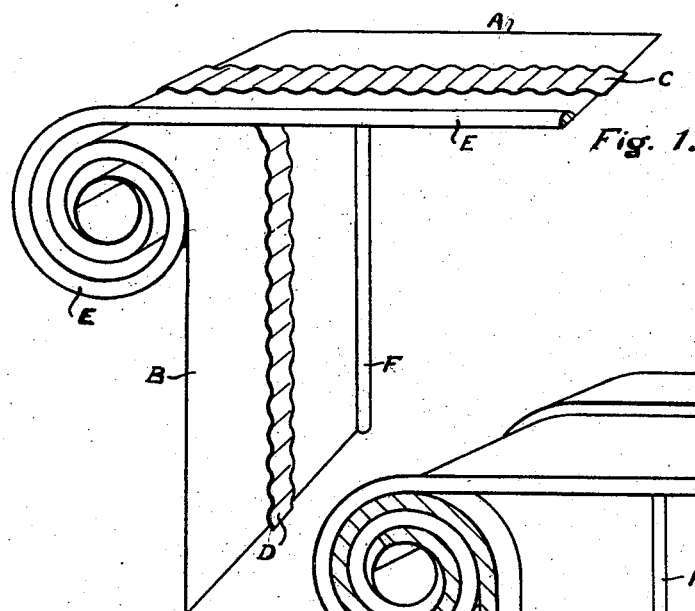

Referring to Fig. 1 two bands of filter paper A, B may be attached to one another at the start of the winding, the end of the band A protruding a short distance beyond the end of the band B. The bands are first wound on themselves for a few turns, then the spacing strips C and D of corrugated paper are wound between the bands A and B. The bands A and B are provided each along one edge, as shown, with raised beads or ridges, or narrow strips, E and F, of latex or another plastic adhesive impervious to gas and of a thickness equal to or greater than that of the overall thickness of the corrugated strips C and D. The winding of the coil is continued until the pack is of the required size, when the spacing strips C and D are cut, and the beads of latex E and F terminated, the bands A and B being then wound on themselves again for a turn or two. The bands A and B are then cut, one band end preferably extending slightly beyond the other, and they are attached one on the other by an adhesive. The coil can then be removed from the mandrel.

Figure 2:
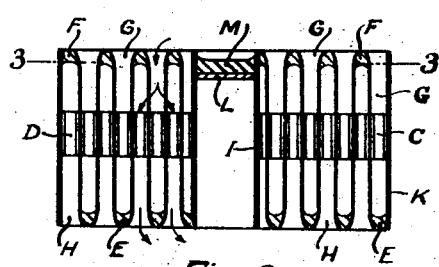
Fig. 2 is a vertical section through the centre of the finished pack.
Figure 3:
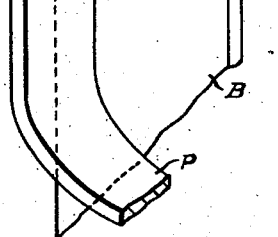
Fig. 3 is a sectional plan view on the line 3—3 of Fig. 2.

There is thus formed a pack, with two spirally shaped spaces or chambers G, H, the chamber G being open along its top edge in Fig. 2 and closed along its bottom edge by the bead of latex E, while the other chamber H is open along its bottom edge and closed at the top by the bead of latex F.

The inner wall I of the pack may be coated with latex and also the outer wall K. The central opening is closed for instance by a cardboard cap L and above the cap is a filling of bitumen M.

Figure 4:
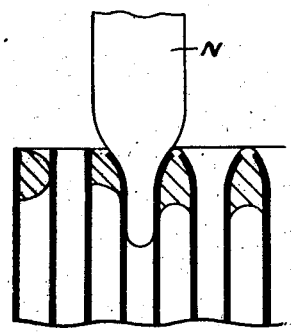
Fig. 4 is a fragmentary sectional view on a larger scale illustrating one method of finishing the closing of an edge of one of the chambers.

In Fig. 4 is illustrated a method of securing the firm adhesion of the borders of the filter paper bands to the adhesive beads between them. A taper-ended spreading tool N is inserted in the open edge of the spiral chamber sufficiently far to open out or flare the edge of the chamber and is moved along the open edge, so that at the same time it presses the borders of the filter bands onto the latex, while squeezing the latter.

As indicated by the arrows in Fig. 2 air can enter the pack by the open edge of chamber G, pass through either of the filter bands forming the walls of this chamber and then leave the pack by the open edge of chamber H.

It will be seen that the chambers G and H are impermeably closed at their edges respectively by the beads of latex E and F, lying between the borders of the bands forming the walls of the chambers and impermeably closed at their ends, in a direction substantially axial of the pack, by the bands A and B lying closely upon one another and if desired adhering to one another. No air can pass through the hollow middle of the pack, and the pack, in use, fits closely within a suitable receptacle and no air is allowed to pass between the outside wall of the pack and the inner wall of the receptacle.

In actual manufacture, the preferred method of making a filter insert according to the invention is as follows:

The first operation is to fasten upon one side of a long band of filter paper two narrow corrugated spacing strips of paper, on either side of the centre of the band and about midway between the centre and the edges of the band. This may be done by winding the band of filter paper off one roll onto another, and simultaneously drawing the narrow strips of paper off their rolls, passing the strips between rollers grooved in the axial direction to corrugate them transversely, passing the narrow corrugated strips above a roller rotating in a bath of adhesive and having one or more raised portions on its surface, which will intermittently apply adhesive to the corrugated strips, and winding the corrugated strips onto the coil on which the long filter paper band is being wound up, so that the corrugated strips are interwound with the filter paper band and caused to adhere thereto. Preferably the corrugated strips are guided by rollers to come into contact with the filter band before the latter reaches the coil and preferably the coil is driven at a differential angular speed, to give a constant lineal speed to the filter paper band.

The second operation is to interwind into a single coil two such bands of filter paper, each provided with two narrow corrugated spacing strips, so that the convolutions of the band are kept spaced from one another. The ends of the respective bands are attached by an adhesive to a paper tube which is carried on an expanding mandrel and the winding operation is started. Simultaneously as the bands approach the coil into which they are being wound, there is deposited, as for instance by an extrusion apparatus, upon each filter band, on the surface which faces inwards of the coil, and at the right hand edge of one band and at the left hand edge of the other band, a strip or ridge of an adhesive sealing substance such as latex, in order to form a seal to close the appropriate spaces between the edges of the filter paper bands, or two ridges or strips of adhesive may be applied to both filter bands, one on one side and the other on the other side of each band, and at opposite edges, so that the seal is effected by the strips of adhesive coming in contact.

The coil may be rotated at a gradually diminishing angular speed, so that the lineal speed of the filter bands is kept constant as the diameter of the coil increases.

A slight drag is applied to the drums from which the filter paper bands are drawn, so that the coil is wound under tension and the filter paper bands and the spacing strips are thus formed into a compact coil. A loaded roller is also mounted to bear upon the coil as it is wound up, so as to hold the sealing material in close contact with the edges of the bands between which it lies. When the coil has been wound to the desired size, the bands are cut and the ends of the bands are stuck down onto the coil so as to form a self-contained insert which will not come uncoiled, and wherein the outer ends of the two volute chambers between the filter paper bands as well as the inner ends of the two chambers are sealed on lines substantially parallel with the axis of the coil.

The next step is to dry out the inserts thus made and this is done by passing the inserts slowly through a drying oven, while they are supported on pegs passing through the central openings, or by other suitable means, so that the ends of the inserts and the sealing medium carried by the ends are not in contact with any other body.

Instead of the two spacing strips being in the positions above described, one may be along the edge of the band and the other along the middle. Or more than two spacing strips may be used or only one.

The inner and outer ends of the two chambers having been sealed off impermeably in the manner described it is not necessary that the coil should be coated with latex or the like on the inside or on the outside, but this may be done if desired. The central opening through the coil, however, must in any case be closed and sealed, as for instance by the cardboard cap L and a filling of bitumen M, above referred to. This operation may be carried out after the pack has been dried, or, it may be carried out at an earlier stage.

The finished insert is finally sealed into a metal or other container, and a filling of latex or bitumen, for example, is run into the space all round the insert, between the inside wall of the container and the outside wall of the insert, so that no air can pass between the container wall and the outside of the insert.

The above described method of making the pack may be departed from in various respects. Thus, instead of the material for sealing the edges of the chambers being introduced during the rolling of the pack, it may be applied after the pack is rolled, the pack ends being dipped in latex so that it fills all the spaces at the ends of the pack and the latex then being removed, for instance by the use of a tool similar to that shown at N in Fig. 4, from the chamber edges that are to be left open.

Figure 5:
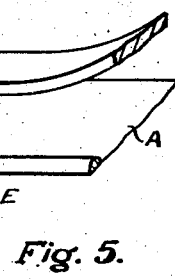
Fig. 5 is a perspective view showing the filter bands being wound with spacing means between them which can be withdrawn after the pack is wound.

In another modification spacing means equivalent to the corrugated strips C and D may be dispensed with and the spacing of the filter bands, during rolling of the pack, may be effected by means which are subsequently withdrawn from the pack. A method of achieving this is illustrated in Fig. 5. Here the latex beads E and F are applied as before to the appropriate edges of the bands, but instead of corrugated spacing strips being used which remain in the pack, spacing strips O and P are inserted between the filter bands and projecting beyond the ends of the pack, so that they can subsequently be withdrawn from the completed coil. These strips O and P may conveniently be of rubber, of about the thickness of the beads E, F, of latex. After their removal the open edges of the chambers G and H may be flared or opened by means of a suitable tool as described above with respect to Fig. 4.

In the accompanying drawings, for the sake of clearness, the pack is shown with a smaller number of turns than usually employed in practice, and with the spacing between the filtering bands exaggerated.

I claim:

1. A filter insert pack of the class described including two plain bands of filtering material coiled one over the other with the convolutions of one band interleaved with the convolutions of the other band, spacing means between the bands for providing two separate chambers interwound with one another and divided from one another on both sides of a wall of filtering material, each band having on one edge thereof a bead of sealing material disposed opposite to the bead on the other band, said sealing material being plastic, adhesive and impervious to gas and coiled with the bands, each chamber having one edge closed at one end of the pack by the sealing material lying directly thereon between the borders of the bands forming the walls of the chamber and the other edge open at the other end of the pack, said sealing material adhering to adjacent portions of the bands to close the same, the convolutions of the closed edge of one of the chambers alternating with the convolutions of the open edge of the other chamber at the same end of the pack, the two ends of the chambers being closed in a direction substantially axial to the pack, the formed volute chambers being undivided over most of their area and free from obstruction from end to end in the peripheral direction of the pack, the parts being constructed and arranged so that none of the air to be filtered can pass through the pack except by entering the open edge of one of the chambers at one end of the pack and passing through a wall of filtered material into the other chamber from the open edge of which it is free to escape at the other end of the pack.

2. A filter insert pack as called for in claim 1, wherein the opened ends of the chambers are flared and pressed outwardly against the sealing material to insure firm adhesion of the sealing material with adjacent portions of the band.

3. A filter insert pack as called for in claim 1, in which corrugated spacing material is disposed between the band and is readily traversed by the air to be filtered.

4. A filter insert pack of the class described including two plain bands of filtering material coiled one over the other with the convolutions of one band interleaved with the convolutions of the other band but spaced therefrom, so that two separate chambers are formed interwound with one another and divided from one another on both sides of a wall of filtering material, each band having on one edge thereof a bead of sealing material disposed opposite to the bead on the other band and coiled with the bands, said sealing material being impervious to gas, each chamber having one edge closed at one end of the pack by the sealing material lying between the borders of the bands forming the walls of the chamber and the other edge opening at the other end of the pack, said sealing material adhering to adjacent portions of the bands to close the same, the convolutions of the closed edge of one of the chambers alternating with the convolutions of the open edge of the other chamber at the same end of the pack, the two ends of the chambers being closed in a direction substantially axial to the pack, the formed volute chambers being undivided over most of their area and free from obstruction from end to end in the peripheral direction of the pack, said pack having a hollow axially disposed center, the inner and outer walls of the pack having a coating impervious to the air to be filtered, and a cap closing at least one end of the central space, the parts being constructed and arranged so that none of the air to be filtered can pass through the pack except by entering one of the chambers at one end of the pack and passing through a wall of filtered material into the other chamber from which it is free to escape from the other end of the pack.

MIROSLAV SIGMUND.